Patented Oct. 14, 1947

2,429,088

UNITED STATES PATENT OFFICE 2,429,088

PRODUCTION OF ELECTRICAL CONDENSER PLATES

Ernest Robert Box, London, England, assignor to Johnson, Matthey & Company Limited, London, England, a British company No Drawing. Application May 19, 1943, Serial No. 487,651. In Great Britain July 14, 1942

2 Claims. (Cl. 117—46)

This invention relates to the production of electrical condenser plates by the application of a metallic film to a predetermined area of the surface of one or both sides of a suitable dielectric.

According to this invention electrical condenser plates are produced by applying to a suitable dielectric by means of a meshed printing screen a paste comprising a mixture of an organic liquid screen-printing medium with a metal compound decomposable by heat to leave a residue of metal, and thereafter firing the coated dielectric at such a temperature and for such a period of time that the organic matter is burned away and the metal compound is decomposed to yield a layer of metal which adheres firmly to the dielectric.

Suitable metal compounds are gold, platinum or silver oxides, hydroxides, amino compounds or salts of organic or volatile inorganic acids other than halides, or other compounds which decompose at the firing temperature to leave a residue of metal.

The screen consists of a piece of, for example, silk or other woven material stretched over a frame and the meshes of the screen are obscured by a stencil or by a suitable filler except at the parts where it is desired that the paste comprising the metal compound and the liquid medium should pass through onto the dielectric. While the paste is usually applied to the dielectric in the shape of a rectangle or square, any other shape may be applied if desired. The paste is forced through the screen for example by means of a roller or squeegee after the dielectric has been located in the appropriate position under the screen.

It is preferred to use mica as the dielectric, but any other dielectric which is suitable for condenser plates and which is capable of withstanding the firing operation may be used. Examples of such other dielectrics are glass and porcelain.

When a silver film is required, I prefer to use silver oxide as the heat-decomposable compound because it has a high silver content and there is therefore less shrinkage during the formation of the film of metallic silver during the firing operation. Similarly when a gold film is required I prefer to use gold oxide and when a platinum film is required hydrated platinum dioxide as the heat-decomposable metal compound.

The liquid screen-printing medium which is used for making the compound into a paste suitable for application to the dielectric by means of a screen should be relatively viscous so as to form a paste which can be squeezed cleanly through the mesh of the printing screen to give a continuous uniform layer of paste which when subsequently heated leaves a residual metal film free from bubbles and cracks. Examples of such media are solutions of a cellulose ester or ether in a volatile organic ester solvent, or solutions of drying oils, gums, and synthetic and natural resins in appropriate volatile solvents. I have found that very satisfactory results may be obtained with a solution of cellulose nitrate or ethyl cellulose in ethyl, amyl or butyl acetate, lactate or phthalate. In some cases it is advantageous to add to the liquid medium a plasticiser, such as diethyl or dibutyl phthalate, medicinal paraffin, castor oil or methyl abietate.

Adherence of the metal film to the dielectric may be improved where desired by the addition to the paste of a suitable flux, such for example as lead silicate, lead borate or lead boro-silicate, or the corresponding bismuth compounds or mixtures of two or more of the aforesaid.

After the paste comprising a heat-decomposable metal compound with or without the addition of a flux has been applied to the dielectric by means of a screen, the firing operation is carried out by heating at such a temperature, generally from 400° to 600° C., and for such a period, generally from 2 hours to 5 minutes (depending on the temperature), that the organic matter is burned away, the metal compound is converted into a metal film and this film adheres firmly to the dielectric.

The film of metal thus produced on the dielectric is of uniform thickness and texture throughout and the condenser plates obtained have excellent electrical properties.

The following example will further illustrate how the said invention may be carried out in practice, but the invention is not restricted to this example.

Example

A paste of a consistency suitable for application through a screen is made from finely powdered silver oxide and an 8% solution of cellulose nitrate in butyl lactate. If desired, 3% of lead borosilicate, calculated on the weight of silver oxide, may also be added as a flux to improve the adherence of the silver film later to be formed.

A strip of mica, cut to the appropriate size, is then located beneath a screen to which has been applied a stencil having an aperture of the exact area and shape of the film of silver which it is desired to apply to the mica. The paste prepared as above is then forced through the screen on to the mica by drawing a squeegee across the upper surface of the screen. The layer of paste is allowed to dry and then another layer is applied to the reverse side of the mica.

The mica bearing the two layers of paste is then fired at a temperature of 500° C. for 40 minutes.

This method of application, followed by the firing process as described, provides on each side of the plate a continuous compact film of silver of uniform thickness and texture. This film adheres firmly to the plate and all air between the mica and the silver is thereby excluded. Condenser plates produced as described in this example are characterized by high electrical capacity, non-variability of capacity under varying working conditions and minimum deviation of the phase angle from 90° when used with alternating currents.

What I claim is:

1. A process of producing electrical condenser plates which consists in applying to mica by means of a meshed printing screen a paste made from silver oxide, a lead borosilicate flux and a solution of cellulose nitrate in butyl lactate and thereafter firing at 500° C. for 40 minutes.

2. A process of producing electrical condenser plates which consists in applying to mica through a meshed printing screen a paste made from silver oxide, a lead borosilicate flux and a solution of cellulose nitrate in a solvent selected from the group consisting of amyl lactate and butyl lactate, and thereafter firing at a temperature from about 400° C. to 600° C. for from about two hours to about five minutes, depending on the temperature, until the organic matter is burned away and the silver oxide is decomposed to yield a layer of silver free of bubbles and cracks and of uniform thickness and texture which adheres firmly to the mica.

ERNEST ROBERT BOX.

REFERENCES CITED

The following references are of record in the file of this patent:

UNITED STATES PATENTS

| Number | Name | Date |
|---|---|---|
| 1,123,422 | Swift | Jan. 5, 1915 |
| 1,300,394 | Hoffman | Apr. 15, 1919 |
| 1,922,387 | Muller | Aug. 15, 1933 |
| 2,161,888 | Rearick | June 13, 1939 |
| 2,156,414 | Wamsley | May 2, 1939 |
| 1,977,625 | Ernst | Oct. 23, 1934 |
| 2,262,791 | Bransford | Nov. 18, 1941 |
| 2,130,215 | Young | Sept. 13, 1938 |

FOREIGN PATENTS

| Number | Country | Date |
|---|---|---|
| 440,948 | Great Britain | Jan. 6, 1936 |
| 790,617 | France | Sept. 9, 1935 |